United States Patent [19]
Spofford et al.

[11] Patent Number: 5,913,037
[45] Date of Patent: Jun. 15, 1999

[54] DYNAMIC MANAGEMENT INFORMATION BASE MANAGER

[75] Inventors: Jason J. Spofford, Travis County; Richard G. Russell, Williamson County; Rodney S. Canion, Travis County, all of Tex.

[73] Assignee: Compaq Computer Corporation, Houston, Tex.

[21] Appl. No.: 08/675,582

[22] Filed: Jul. 3, 1996

[51] Int. Cl.[6] .............................. G06F 15/17; G06F 13/38
[52] U.S. Cl. ................................ 395/200.56; 395/184.01; 395/200.54; 395/200.5
[58] Field of Search ......................... 395/200.56, 200.53, 395/200.54, 200.72, 200.5, 182.02, 184.01; 370/254, 410, 42, 200.54

[56] References Cited

U.S. PATENT DOCUMENTS

| | | | |
|---|---|---|---|
| 5,309,563 | 5/1994 | Farrand et al. . | |
| 5,367,635 | 11/1994 | Bauer et al. | 395/200.53 |
| 5,461,609 | 10/1995 | Pepper | 395/182.02 |
| 5,491,796 | 2/1996 | Wanderer et al. . | |
| 5,509,123 | 4/1996 | Dobbins et al. . | |
| 5,559,958 | 9/1996 | Farrand et al. | 395/200.53 |
| 5,726,979 | 3/1998 | Henderson et al. | 370/254 |

OTHER PUBLICATIONS

Barnett, D.S.; "Tools speed network–management setup"; *Electronic Engineering Times*; pp. 36,51, Jun. 17, 1996.
S. Jeng, T. Chin, J Lin, S. Hung, and C. Tsai "Network Management Platform Approach and its Application—KView II",*IEEE, Mar.*, 1994, pp. 417–424.

*Primary Examiner*—Mark H. Rinehart
*Attorney, Agent, or Firm*—Akin, Gump, Strauss, Hauer & Feld, L.L.P.

[57] ABSTRACT

A MIB manager including set of software interfaces, semantics, procedures and data structures that work together as a system to dynamically manage a tree of SNMP data objects identified by a standard object identifier (OID) along with each object's value. An agent uses the interface of the MIB manager to add and delete MIB objects by OID. When one or more new objects are added to the MIB tree, the agent provides the MIB manager with references to subroutines within the agent and external to the MIB manager, which subroutines operate to manage the identified objects by monitoring and controlling the objects' values. This enables the MIB manager to be implemented in a manner independent of the application and hardware. The MIB manager allows agent to add new objects at any level within the MIB tree, thus allowing modification at any desired degree of granularity. The agent may add a single leaf element, a table row, an entire table or an entire branch of the MIB tree. If the agent adds a branch to the MIB tree through the MIB manager interface, where the branch is itself a tree of MIB objects, then the agent includes proper procedures for managing the objects and values for that branch. Security information may also be defined for new objects, either by referencing an existing access rights definition or by referencing new access rights.

22 Claims, 7 Drawing Sheets

DYNAMIC MANAGEMENT INFORMATION BASE MANAGER

FIELD OF THE INVENTION

The present invention relates to network management, and more particularly to a dynamic MIB manager for dynamically managing a tree of data objects.

DESCRIPTION OF THE RELATED ART

The SNMP (simple network management protocol) is a set of standards for managing network resources, including a protocol, a database structure specification and a set of data objects. SNMP is the standard for networks based on TCP/IP (transmission-control protocol/internet protocol) and IPX (internetwork packet exchange). Version 2 of SNMP, or SNMPv2, is a security enhancement to SNMP, which is intended to run on network management systems based on TCP/IP. The present invention is illustrated using SNMP and TCP/IP, although it is understood that the present invention is applicable to any particular network protocol. Furthermore, the present invention is not limited to network systems and is applicable to any type of device to be managed.

The database structure for SNMP is referred to as a management information base (MIB), which is a database containing information about the elements to be managed for networks. A MIB is a definition of a structured collection of objects representing one or more resources of the network to be managed. The objects in the MIB are ordered in a hierarchical tree structure, typically defined with the ASN.1 (abstract syntax notation one) standard, which is a formal language for defining abstract syntaxes of application data. The root of the SNMP MIB tree currently has three nodes, including an iso (International Organization for Standardization) node, a ccitt (International Consultative Committee on Telegraphy and Telephony) node, and a joint-iso-ccitt node. Several standardized MIBs are known, including MIB-I, MIB-II, Host MIB, Bridge MIB, Hub MIB, RMON MIB, among others. Each of the resources or network devices, such as computer systems or nodes, switches, routers, brouters, bridges, hubs, etc. in a network may have a standard or enterprise-specific MIB for management purposes.

Each object in the MIB is accessed using an object identifier (OID), which comprises a sequence of integers for traversing the successive nodes of the tree structure. Each object in the MIB has a syntax type, which, by the SMI (structure of management information) convention, is the universal class including integers, octet string, null, object identifier and sequence. Other allowable data types are defined, including IpAddress, Counter32, Gauge32, TimeTicks, Opaque, Counter64 and Unsigned32. The SMI identifies the data types that may be used in the MIB and how resources are represented and named in the MIB. Each object also has a value. For example, an object of type integer may have a value of 9. Each object or a set of objects defines the status and characteristics of a network resource. A resource manager or management console monitors the status of the resources by reading the values of the objects and controls the resources by changing the values of the objects. The management information includes statistical, security, identification, etc. information, such as packet counts, error counters, time counters, Ipaddresses, etc.

In general, some sort of network or resource manager, such as a software agent, implements an MIB. For example, a software agent operating on a network switch or repeater maintains an MIB for managing that network device. A management console operating on a computer system in the network may monitor and manage a network device by sending SNMP requests to a software agent running on the device, where the agent accesses its local MIB to retrieve or modify MIB objects. The SNMP request includes one or more OIDs to the objects in the MIB of interest. For example, the management console sends a "get", "getnext" or "set" operation to a software agent across the network or other communications path, which accesses the MIB and responds by reading or modifying, respectively, one or more objects identified by the OIDs in the MIB according to the specific operation. The get operation is used to read the value of an object identified by an OID and the getnext operation is used to read the value of the next object or "leaf" in the MIB tree referenced by a given OID. The set operation is used to modify the value of an object identified by an OID. A "trap" operation is similar to an interrupt, where if the value of an object changes, the software agent respondingly sends the new value to a management console.

Conventionally, the structure of the MIB was established at power up, reset, or during initial configuration, but thereafter remained static. In other words, the values of the objects were monitored and modified, but the MIB structure itself remained unmodified during normal operation. Sub-agents were sometimes used to modify the MIB structure, but usually such modification was at a relatively high level of granularity and was only performed at power up or reset and initialization of the system. During operation, the MIB structure remained static and could only be changed by recycling the power or resetting the system.

A network system is often dynamic. In particular, nodes or network devices are often modified or removed, and new nodes or devices are added to increase the size or to upgrade a network system. For example, a fast Ethernet network repeater or switch with a plurality of ports operating at 100 megabits per second (Mbps) may include an uplink port for extending the network. If the uplink was not initially installed at power up, it is desired to hot plug the uplink during operation without power cycling the system. A device being managed using an MIB, such as a computer system, is also dynamic and is often dynamically modified in one way or another. However, due to the static nature of the MIB, although new drivers might be added to the system, its power had to be recycled to update the management structure. Otherwise, the new drivers or routines were useless since the MIB did not include the definitions of the new objects to be managed.

It is desired to modify or otherwise upgrade a system without resetting the system or powering it down, while dynamically adding to or otherwise modifying the management structure of the system to enable management of new or modified devices and resources. It is further desired to dynamically modify the MIB at any level of granularity, at any level of complexity and at any time during operation.

SUMMARY OF THE INVENTION

A dynamic management information base (MIB) manager according to the present invention is a set of software interfaces, semantics, procedures and data structures that work together as a system to dynamically manage a tree of SNMP data objects identified by a standard object identifier (OID) along with each object's value. A MIB manager according to the present invention is fully dynamic. An agent uses the interface of the MIB manager to add and delete MIB objects by OID. When a new object or set of objects is added to the MIB tree, the agent provides the MIB manager with references to subroutines within the agent and external to the MIB manager, which subroutines operate to manage the identified objects by monitoring and controlling the objects' values. This enables the MIB manager to be implemented in a manner independent of the application and hardware.

The MIB manager allows an agent to add new OIDs at any level within the MIB tree, thus allowing modification at any desired degree of granularity. The agent may add an OID for a single leaf element, for a row in a table, for an entire table, or for an entire branch of the MIB tree. If the agent adds a branch to the MIB tree through the MIB manager interface, where the branch is itself a tree of MIB objects, then the agent includes proper procedures for managing the objects and values for that branch. This feature enables a MIB manager according to the present invention to be integrated with existing or future MIB management methods.

A MIB manager according to the present invention maintains a MIB structure of objects for control by an agent. The agent includes functions for managing initially defined objects in the MIB structure and a definition of one or more new objects. The MIB manager includes an agent interface for receiving commands from the agent and for providing object values to the agent from the MIB structure, a MIB interface for reading and modifying object values in the MIB structure and for modifying the MIB structure, and one or more functions for reading and modifying values of objects in, for adding objects to and for removing objects from the MIB structure as controlled by the agent. A MIB manager function adds a new object to the MIB structure in response to a request by the agent and according to the definition within the agent of the new object. Another MIB manager function removes one or more existing objects in the MIB structure as desired.

Security of each added module is dynamically defined as well. A newly added object, table row, table or branch may reference an existing security definition or a new security definition may be defined. A security definition establishes a set of access rights for management stations, where access rights include no access, read-only access or full or set (read-write) access. Access rights may be defined so that different management stations have different levels access. Thus, for example, four different management stations may see four different views of the same MIB based on the different access rights.

A management module according to the present invention for managing a device includes a processor and memory for storing data and executable code for execution by the processor. The data and executable code includes a MIB structure defining objects associated with the device for managing the device and a MIB manager for maintaining the MIB structure, the MIB manager including executable code for dynamically modifying the structure of the MIB structure during operation. The management module memory further includes an agent with executable code for managing operation of the device as defined by objects within the MIB structure. The agent interfaces with the MIB manager to read and modify values of said objects. The MIB manager includes an agent interface for enabling the agent to manage operation of the device through the MIB manager. The memory further includes an upgrade module for upgrading the agent, where the upgrade module includes a definition of at least one new object for adding to the MIB structure, and a procedure called in response to changes of the device for commanding the MIB manager to add the definition of the new object to the MIB structure. The MIB manager adds the definition of the new object to the MIB structure in response to the procedure. The upgrade module further includes a remove procedure called in response to changes of the device for commanding the MIB manager to remove an identified object from the MIB structure, and executable code for managing the new object. Alternatively, the agent includes the add and remove procedures rather than the upgrade module.

The management module describe above may be used in any network or non-network device, where it is desired to manage certain aspects and parameters of that device. A network device, such as a repeater or switch, may further include hardware options for modifying or upgrading the network device. For example, a fast Ethernet repeater may include a slot for receiving and coupling an uplink device for expanding the network. The software agent managing the device may include object definitions, procedures and functions for managing the uplink device. In a more modular approach, a new software module is added to upgrade the agent, where the new software module includes the object definitions and the management code. In either case, the agent or the new module calls the functions within a MIB manager according to the present invention, which updates the MIB structure accordingly to enable management of the uplink device. A management station or node in the network may further include a management console for submitting SNMP requests to the agent. In this manner, the management console queries the status of the network device, and, if installed, the status of the uplink device.

A network device including a dynamic MIB manager according to the present invention may further be upgraded to perform greater management tasks. For example, a remote network monitoring (RMON) module and RMON MIB may be added to the agent in a dynamic manner during operation. The RMON module includes procedures for interfacing the MIB manager to upgrade the current MIB. Once the MIB is modified and the RMON module installed, a network device may be used to monitor behavior of a plurality of network devices in the network.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
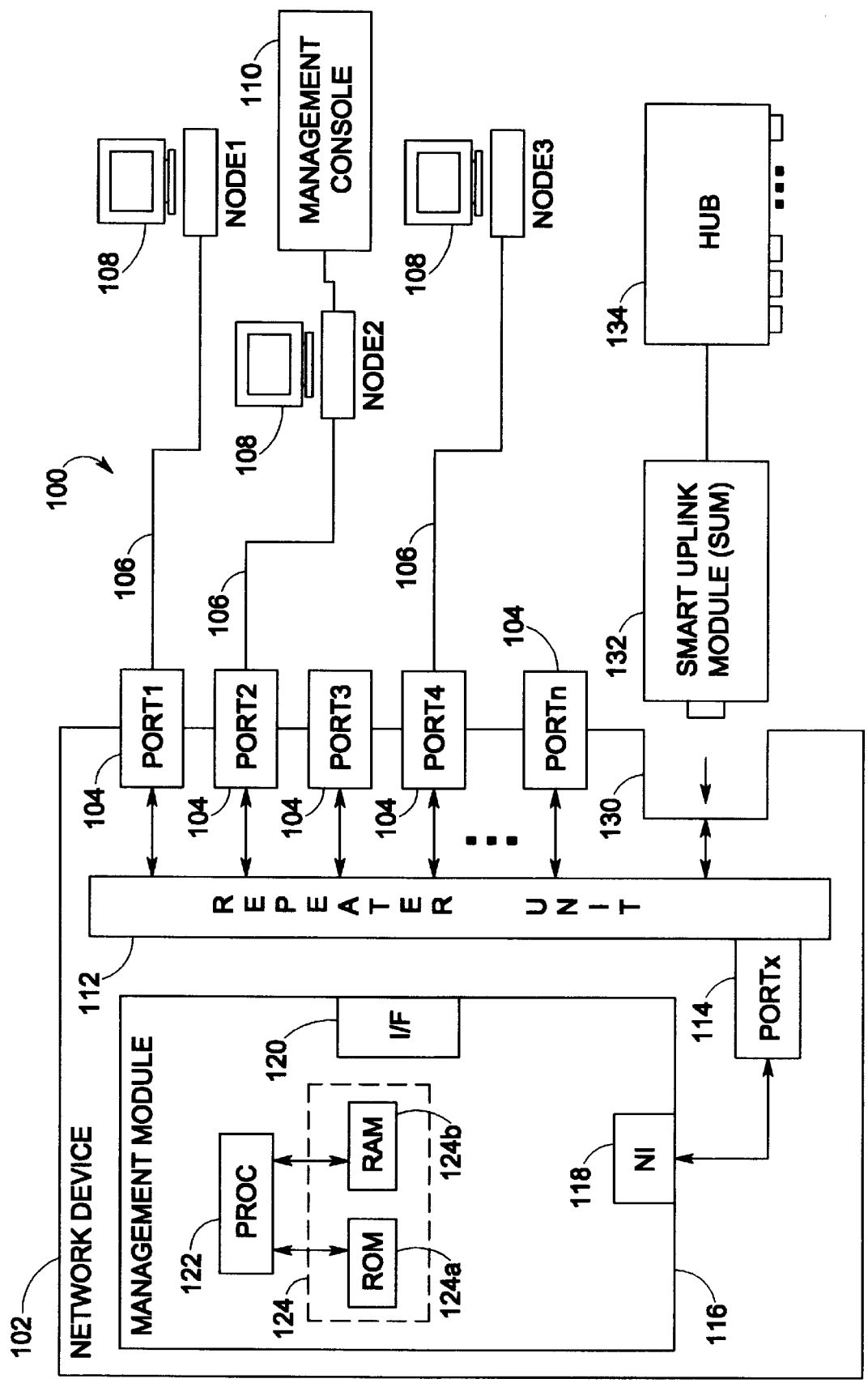
FIG. 1 is a block diagram of a network system including a network device including a dynamic MIB manager implemented according to the present invention.

Referring now to FIG. 1, a block diagram is shown of a network system 100 including a network device 102 with two or more input/output (I/O) ports 104. Each of the ports 104 is for coupling to and for interfacing another network device through an appropriate cable segment 106 adapted for connection to any one of the ports 104. Each port 104 enables bidirectional data flow between the network device 102 and another network device. As shown, there are "n" ports 104, individually labeled PORT1, PORT2, . . . , PORTn for coupling up to n networks devices, where n is any desirable integer. The network devices are generally referred to as nodes 108, which may be computer systems, file serves, workstations, printers, plotters, fax machines, etc. In the example embodiment shown, three nodes 108, or NODE1, NODE2 and NODE3, are coupled to the network device 102 through ports PORT1, PORT2 and PORT4, respectively. Each of the nodes 108 are computer systems including appropriate network interface cards (NICs) and appropriate driver routines and software to enable communication with the network device 102 and with each other. In the embodiment shown, NODE2 is a management node, which further includes a management console 110 for monitoring and controlling network statistics. The management console 110 is typically in the form of software routines and procedures executed by a processor of NODE2 for performing network management functions, as further described below.

Each of the ports 104 enables conversion from a physical connector to an electrical connection to a network unit 112 within the network device 102. In the embodiment shown, the network unit 112 includes an additional internal port 114, which is similar to the ports 104, and which establishes a network connection to a management module 116 within the network device 102. The management module 116 includes a network interface (NI) 118 coupled to the internal port 114 for enabling communication according to the particular network protocol being used by the network device 102. The management module 116 includes a separate interface (I/F) 120 for interfacing the network unit 112 for facilitating management and control of the network unit 112, and for further monitoring and controlling each of the ports 104. The management module 116 includes a processor 122 coupled to memory 124. The processor 122 controls the functions and manages operations of the network device 102 by executing routines, procedures, software modules, etc. stored in the memory 124. The memory 124 preferably includes non-volatile portions, such as read only memory (ROM) 124a or the like for storing the routines or procedures for controlling the network device 102. The memory 124 also includes volatile portions, such as static or dynamic random access memory (SRAM or DRAM) 124b for storing data and parameters generated and modified during operation.

The network device 102 is exemplary and used for purposes of illustration, where it is understood that the present invention may be incorporated into any type of device to be managed, such as network devices including repeaters, switches, routers, brouters hubs, concentrators, nodes, workstations, etc., as well as more general or non-networking resources and devices, such as computer systems, printers, plotters, fax machines, etc. Thus, the present invention may be used for managing any type of electronic device. In the embodiment shown, the network device 102 operates according to an Ethernet standard, such as that specified in IEEE (Institute of Electronic and Electrical Engineers) 802.3, or more preferably the Fast Ethernet as specified in IEEE 802.3u. However, any other type of networking protocol is contemplated where the devices of the network are to be managed. The network device 102 may be a repeater, where the network unit 112 is a repeater unit. Alternatively, the network device 102 may be a switch, where the network unit 112 is a switch unit.

The network device 102 operates to receive information from data devices coupled to each of the ports 104 and to route the information to one or more of the other ports 104 and to the port 114, depending upon the type of network device. For example, a repeater retransmits date to all other ports, whereas a switch selectively filters the data to reduce network traffic. The data or information is in the form of packets, where the particular form of each packet depends upon the protocol supported by the network device 102. A packet is a predefined block of bytes, which generally consists of header, data, and trailer. The format of a given packet depends on the protocol that created the packet. The header usually includes a source media access control (MAC) address identifying a data device originating the packet and a destination MAC address identifying the destination data device. The header may further indicate whether the packet is a multicast or broadcast packet intended for multiple destinations.

In the embodiment shown, the network device 102 further includes a slot 130 adapted to receive a smart uplink module (SUM) 132 and to couple the SUM 130 to the network unit 112. The SUM 132 enables expansion of the network system 100 beyond the standard limits of Ethernet according to the Ethernet specifications. In particular, the SUM 132 is further connected to a hub unit 134 or the like for further coupling to a plurality of other computer systems, nodes or network segments as desired, where the SUM 132 operates to separate the collision domains between the network device 102 and the hub 134.

In the embodiment shown, the network unit 112 and/or the management module 116 is able to detect connection of a new network device or node through any one of the ports 104, and is able to detect the SUM 132 being plugged in. Such detection is either handled out-of-band or in-band. In general, out-of-band detection is generally an electrical connection, such as a grounded signal or the like which is made when a segment 106 or the SUM 132 is plugged in, and which is detected by the network unit 112 and transferred to the management module 116 through the I/F 120. Alternatively, the network unit 112 includes transceivers or the like coupled to each port 104 and the slot 130 for detecting the connection of a new device to a port 104. For in-band detection, the connected device transmits connection signals through a port 104 or the slot 130 according to the communication protocol of the network device 102. Such in-band communication is transferred to the management module 116 through the NI 118 as normal network communications according to the supported protocol. In either event, the processor 122 is informed of the connection in the form of an interrupt signal or by setting a register bit or the like. The processor 122 respondingly executes an appropriate routine to enable communications with the newly connected device.

For purposes of the present invention, it is desired not only to detect and establish communication with a newly added device, but also to dynamically enable management of the device. For example, the SUM 132 is hot-plugged into the slot 130 during operation to expand the network system 100 to include devices coupled to the hub 134. The processor 122 respondingly executes the appropriate routines to establish communications with the SUM 132, and hence the hub 134. According to the present invention, the processor 122 further executes the appropriate routines and procedures within the memory 124 to enable management of the SUM 132 and the hub 134, as further described below.

Figure 2A:
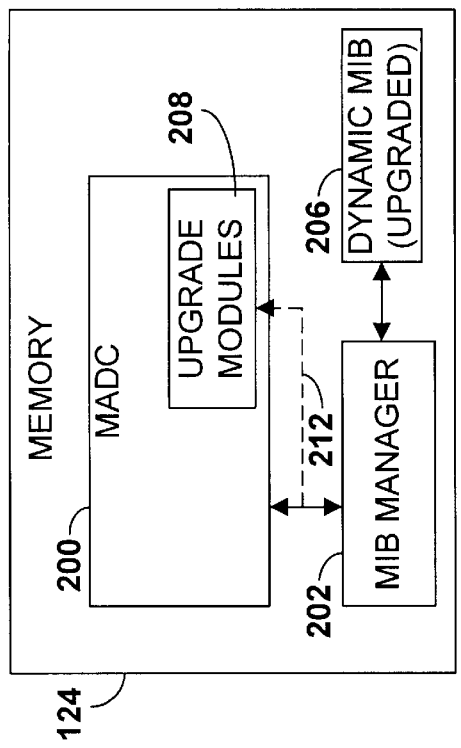
FIG. 2A is a block diagram of the memory including the MIB manager and MIB of FIG. 1.

Referring now to FIG. 2A, a block diagram is shown of the memory 124, which, as described above, includes a non-volatile portion 124a and a volatile portion 124b. The memory 124 stores software, routines, procedures, interfaces, semantics, data structures, etc. (collectively referred to as software) in order to manage the network device 102 as well as some or all devices coupled to the network device 102. The software is executed or otherwise modified by the processor 122 to perform the management functions. A main portion of the software is a management agent and device controller (MADC) 200, which includes the primary procedures, routines and drivers. The MADC 200 interfaces with a management information base (MIB) manager 202, which is implemented according to the present invention. The MIB manager 202 interfaces and controls a dynamic management information base (MIB) 206, which is a definition of the information about the elements to be managed for the network system 100.

Figure 3:
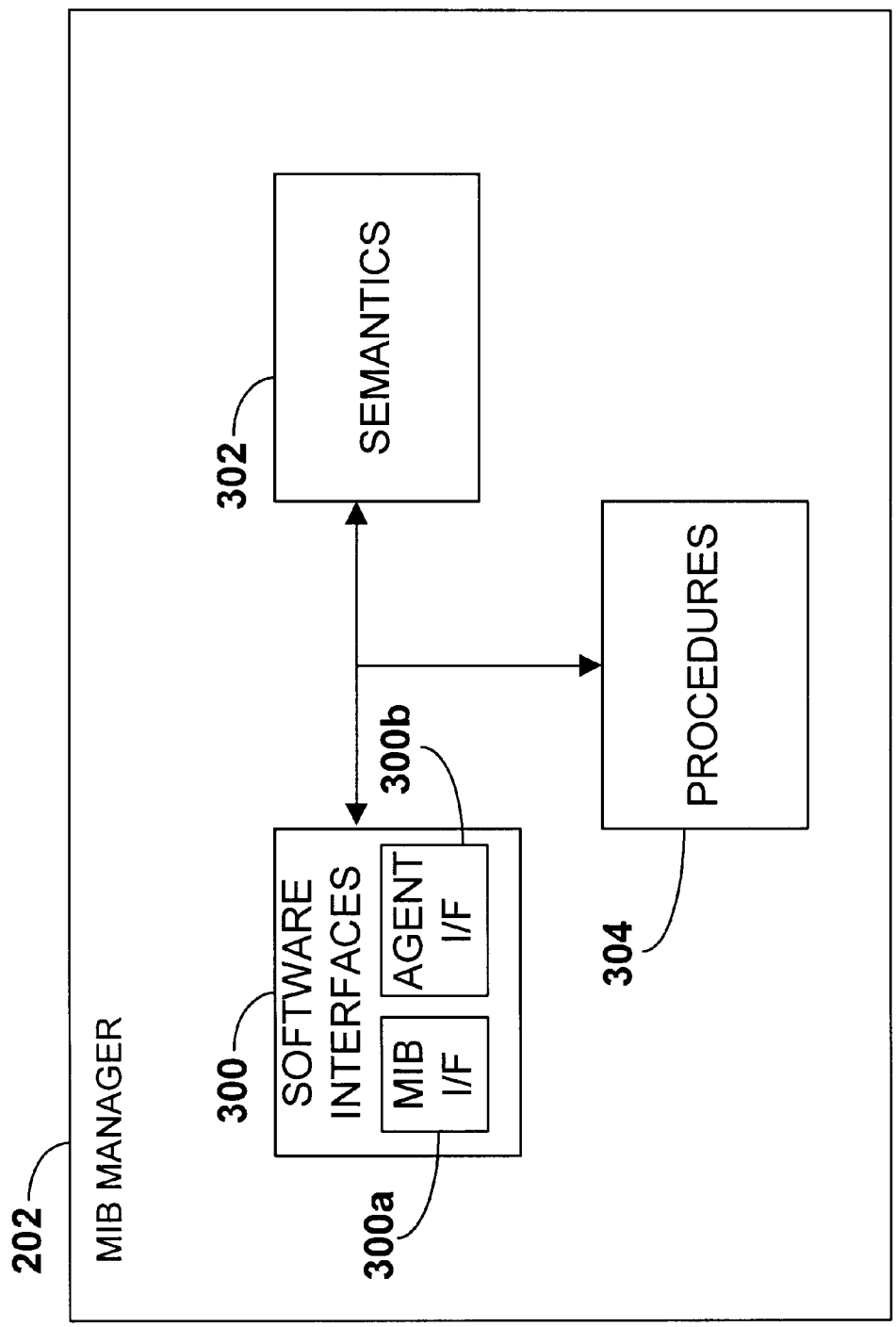
FIG. 3 is a block diagram of the MIB manager of FIGS. 2A–2D.

As shown in FIG. 3, the MIB manager 202 is a set of software interfaces 300, semantics 302, and procedures 304 that work together as a system to dynamically manage the MIB 206. The software interfaces 300 include a MIB interface 300a to enable the MIB manager 202 to interface with the MIB 206 including any modifications thereto, and an agent interface 300b to interface with the MADC 200, and further to interface with other software modules, described further below, that are either incorporated within the MADC 200 or added thereto in any manner. The semantics 302 define the rules and relationships for enabling the MIB manager procedures 304 to interface with the MIB 206 and the MADC 200 and other external software procedures and modules through the interfaces 300.

Referring back to FIG. 2A, the MIB 206 is a tree or list of SNMP data objects, each identified by an object identifier (OID), which list defines the objects that are used to monitor and control the network system 100. The MIB 206 is implemented in any form desired, such as a tree structure defined in a database. For example, the MIB 206 may be formatted and encoded in any manner, such as a sorted and doubly-linked list of elements containing OIDs and corresponding object values. The MADC 200 includes software routines to implement management capabilities by monitoring and modifying the objects defined in the MIB 206. However, the MADC 200 does not interface the MIB 206 directly, but only through the MIB manager 202. Each of the objects in the MIB 206 has a value which may be retrieved and modified by the MIB manager 202 as instructed by the MADC 200 using the OID identifying that object. The MADC 200 may be completely implemented in the ROM 124a, but may also include programmable portions stored in the RAM 124b to enable modification. For example, the MADC 200 may store data and parameters in the RAM 124b. The MIB manager 202 may also be implemented in the ROM 124a and the RAM 124b. In the embodiment shown, however, the MIB manager 202 is entirely implemented in ROM 124b. The MIB 206 is preferably implemented entirely in the RAM 124b to enable dynamic modification. It is noted, however, that a standard portion of the MIB 206 may be stored in the ROM 124a and copied to the RAM 124b upon power-up.

Figure 2B:
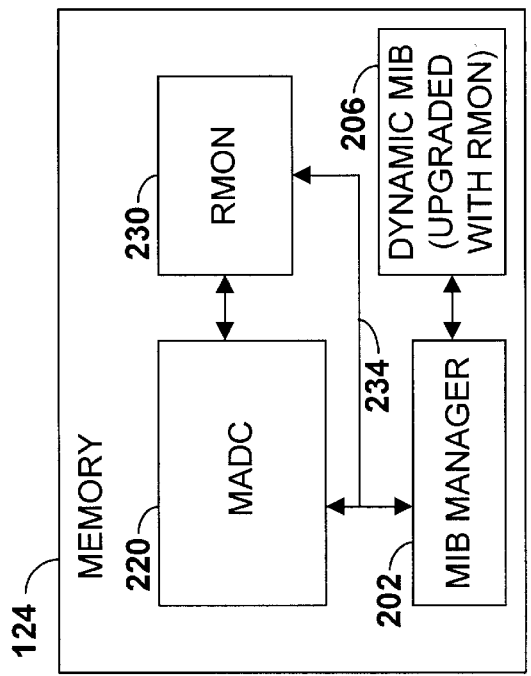
FIG. 2B illustrates dynamic upgrade of the MIB by the MIB manager of FIG. 2B.

The MADC 200 may include standard portions for managing the network device 102 and the nodes 108 coupled thereto. Optionally, the MADC 200 may include one or more upgrade modules 208 including routines and/or data structures for managing optional upgrade network devices coupled to the network device 102, such as the SUM 132 and the hub 134. For example, as shown in FIG. 2B, upon detection of the SUM 132 plugged into the slot 130 of the network device 102, the MADC 200 activates one or more of the upgrade options 208 to manage the SUM 132. However, the MIB 206 must also be modified accordingly to include a definition of the objects to be managed. In particular, the MADC 200 calls internal procedures, or otherwise calls procedures within or otherwise referencing code within the upgrade modules 208, which procedures further call functions in the MIB manager 202 for updating the MIB 206. The MIB manager 202 respondingly updates the MIB 206 to include one or more definitions of the objects to be managed for the SUM 132. The MIB manager 202 further establishes the appropriate links 212 to the upgrade modules 208. The links 212 are shown figuratively to represent communication between the upgrade modules 208 and the MIB manager 202. In this manner, the upgrade modules 208 now interface with the MIB manager 202 for retrieving and/or modifying data objects in the MIB 206 for managing the SUM 132 and the attached hub 134.

Figure 2C:
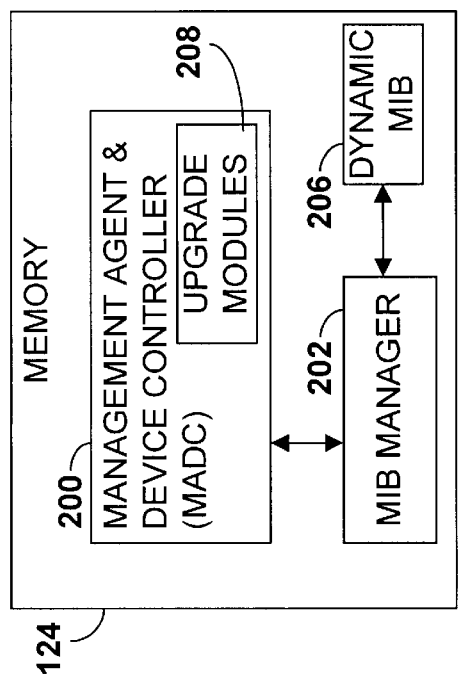
FIG. 2C illustrates a modular approach for receiving software modules for modifying the MIB.

FIG. 2C illustrates a more modular approach to dynamic management. In FIG. 2C, an entirely new software module 222 is downloaded to the memory 124, such as the RAM 124b, and incorporated into a modularized MADC 220. The MADC 220 is implemented in a similar manner as the MADC 200, except in a modularized fashion for adding software modules as desired. Operation is similar, where the MADC 220 executes internal procedures, or calls procedures within or otherwise referencing code or data structures within the software module 222, which procedures further call functions in the MIB manager 202. It is noted that the upgrade procedures may be standardized within the MADC 200 or 220 or incorporated within the added software module 222. The MIB manager 202 updates the MIB 206 and further establishes the appropriate links 212 to the software module 222. The modular approach illustrated in FIG. 2C allows the MADC 220 and the MIB 206 to be upgraded in any manner desired.

It is further noted that in all of the embodiments shown in FIGS. 2A, 2B and 2C, that procedures are also included to remove the upgraded or new modules and to downgrade the MIB 206 as desired. Thus, if the SUM 132 is removed from the slot 130, the MIB manager 202 modifies the MIB 206 to form a new MIB which does not include the objects for the SUM 132.

As a more specific example, suppose the MADC 200 or 220, or one of the upgrade modules 208 or the software module 222 includes the following BRACH structure sumStatisticsTable, which describes a table to be added to the MIB 206 for holding the statistics and other object information for the SUM 132:

Static BRANCH sumStaticsTable =
{
BRANCH_GROUP,
{(Byte*)"\x2B\x06\x01\x04\x01\x83\x28\x01\x0A\x02\x08\x01", 12},
SumStatsGet,
SumStatsNext,
SumStatsSet,
0,

```
BSECURE_FAST_STACK,
0
};
```

The MADC 200 or the MADC 220 includes the following functions for adding to and subtracting from the MIB 206:

```
OnSumInserted()
{
  BranchAdd( & sumStatisticsBranch);
};
OnSumRemoved()
{
  BranchRemove( & sumStatisticsBranch);
};
``` where "& sumStatisticsBranch" is a pointer to the BRACH structure sumStatisticsTable. The SumStatsGet, SumStatsNext and SumStatsSet, correspond to the get, getnext and set operations for reading an object or the next object in the MIB tree or setting an object's value, respectively. The BSECURE_FAST_STACK line denotes a reference to a definition of access rights. In particular, a section of access rights code determines which entities have which access rights to an object, table row, entire table or entire branch in a MIB. Access rights include no access, read or get access, or set or full access (read and write). The security reference may be to an existing definition or to new code defining new access rights. In this manner, different management entities or stations may be given different access rights to a newly added object, table or branch as desired. Further, access rights of different management entities or stations for the different levels of a newly added branch may be the same or may vary as desired.

Furthermore, the MIB manager 202 includes the BranchAdd function for adding the objects defined in the sumStaticsTable to the MIB 206, and includes the BranchRemove function for removing the sumStaticsTable from the MIB 206. The above example illustrates adding a single table element to an existing MIB tree structure. It is understood, however, that the MIB structure may be dynamically modified in any manner and at any level using a dynamic MIB manager according to the present invention.

Figure 2D:
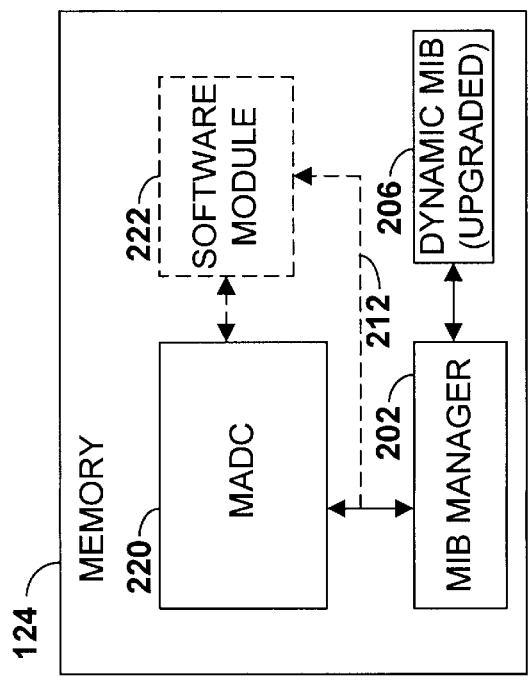
FIG. 2D illustrates upgrading a MIB with a remote network monitoring (RMON) subsystem.

FIG. 2D illustrates another example for adding elements to the MIB 206 provided by a software subsystem, which, in this example, is the remote network monitoring (RMON) subsystem. A standard MIB, such as MIB-II, enables management of a particular device, node or single point of attachment in a network. An RMON subsystem expands the management capabilities and provides an effective and efficient way to monitor network-wide behavior of multiple nodes and devices, while reducing the burden both on other software agents and on management stations, such as the management console 110. Thus, RMON enables a management computer, such as the management console 110, to monitor a network as a whole rather than just individual network devices on the network. As shown in FIG. 2D, an RMON software module 230 is loaded into the memory 124 of the network device 102 and activated by the MADC 220. The MADC 220 or the new RMON software module 230 includes the following BRACH structure RMONBranch, which describes a table to be added to the MIB 206 for holding the RMON objects:

```
Static BRANCH RMONBranch =
{
  BRANCH_GROUP,
  {(Byte*)"\x2B\x06\x01\x02\x01\x01\x01\x10", 7},
  RmonGet,
  RmonNext,
  RmonSet,
  0,
  BSECURE_RMON,
  0
};
```

The MADC 220 includes the following EnableRMONMIB$_0$ and DisableRMONMIB$_0$ functions for adding to and subtracting from the MIB 206, respectively:

```
EnableRMONMIB()
{
  BranchAdd( & RMONBranch);
};
DisableRMONMIB()
{
  BranchRemove( & RMONBranch);
};
``` where "& RMONBranch" is a pointer to the BRACH structure RMONBranch. Again, the RmonGet, RmonNext and RmonSet references the get, getnext and set operations. Also, the MIB manager 202 includes the BranchAdd function for adding the objects dcefined in the RMONBranch to upgrade the MIB 206, and includes the BranchRemove function for removing the RMONBranch structure from the MIB 206. The RMONBranch structure describes the new portion of the MIB tree for the RMON object information. The BSECURE_RMON line defines the access rights for the BRACH structure RMONBranch. If the RMON software module 230 is disabled or otherwise unloaded during operation, the MADC 220 calls the DisableRMONMIB function, which further calls the BranchRemove function within the MIB manager 202 to remove the RMON MIB elements and objects from the MIB 206. An important aspect is that the MIB 206 is dynamically modified by the MIB manager 202 during normal operation, where the network device 102 need not be powered down.

The MIB manager 202 includes add and remove functions for adding and removing objects in the MIB 206 at any level of granularity. The BranchAdd and BranchRemove functions described above are generalized to add or remove nodes of any kind and at any level of the MIB tree, including branches and "leaves", where leaves are the objects themselves. Thus, these functions operate on a single object or any collection of objects. The MIB manager 202 further includes any other desired operations or functions, such as a "query" function for reading the values of objects, a "modify" function for writing a new value of an object, and a trap function for monitoring changes of object values and reporting the change to a controlling software agent.

In this manner, after new objects are dynamically added to the MIB 206, a resource manager or management station, such as the management console 110 of the network system 100, sends SNMP requests, such as get, getnext or set, to the management module 116 of the network device 102 managing a new device, such as the SUM 132, where the requests are received by an agent, such as the MADC 200 or 220 or other software module, such as one of the upgrade modules 208, a software module 222, the RMON module 230, etc. The request or requests include OIDs to one or more objects to be read or modified as desired. The agent interfaces with the MIB manager 202, which executes the corresponding functions in response to the SNMP requests, such as query, modify, etc. to retrieve or modify the information as desired. For a set operation, the MIB manager 202 retrieves the object values identified by OID from the MIB and provides the information to the agent, which reports back to the management console. For a get operation or getnext operation, the MIB manager 202 modifies the object values as requested. If values are monitored according to a trap operation, the MIB manager 202 provides updated object values from the MIB to the agent, which provides the updated values to the management console.

The defined access rights determined whether a particular management station or console may perform the operation requested. For example, a management station having read-only access attempting a set operation will be denied.

Figure 4:
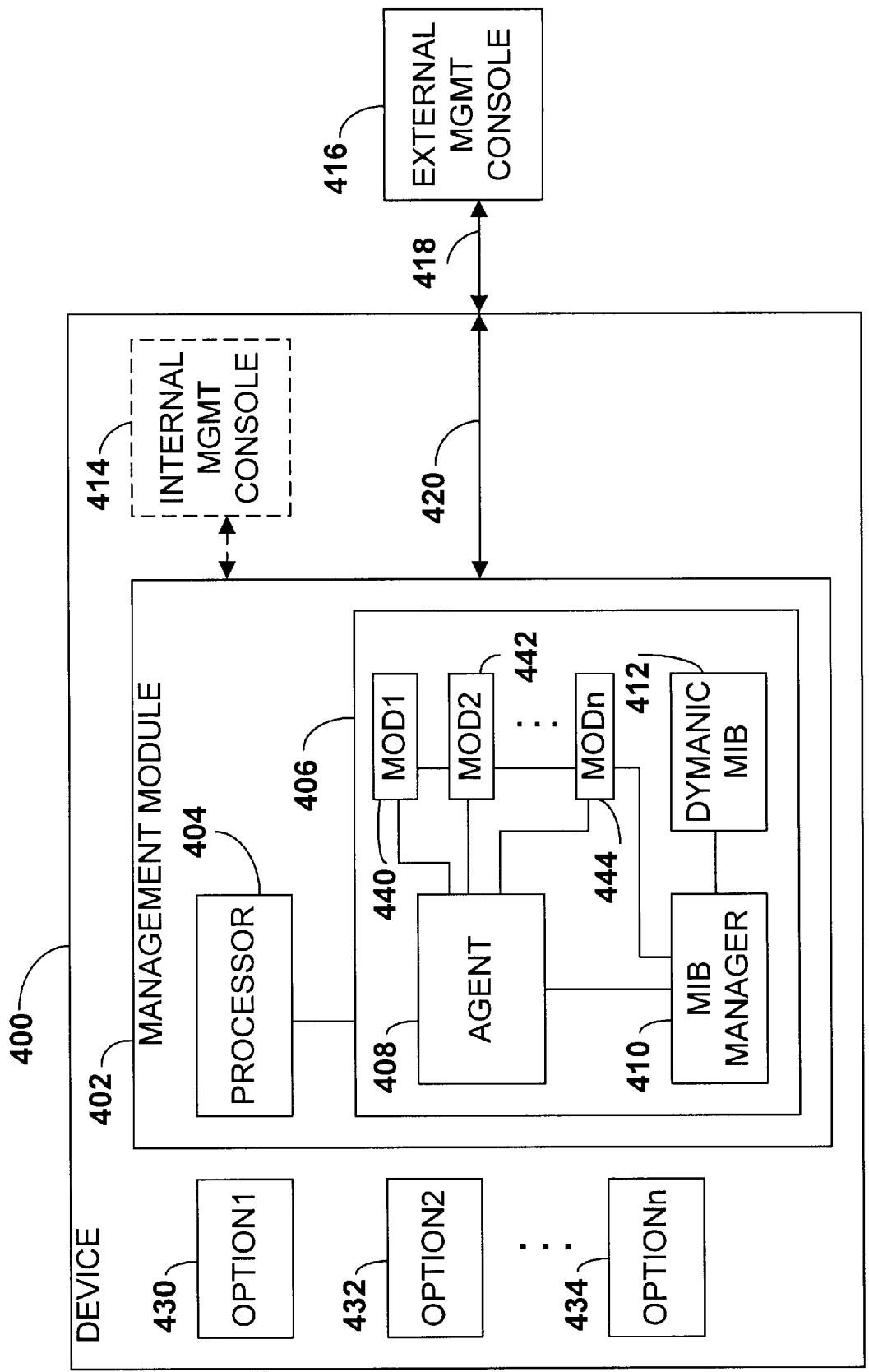
FIG. 4 is a block diagram of a generalized device incorporating a dynamic MIB manager implemented according to the present invention.

FIG. 4 is a block diagram of a device 400 illustrating the present invention. It is desired to manage the device 400, which may be a network device, as described above, or any other type of non-network device. The device 400 includes a management module 402, which further includes a processor 404 and memory 406. In a similar manner as described above, the memory 406 includes volatile and non-volatile portions, such as RAM and ROM or the like. Within the memory 406 is stored an agent 408 including executable code, functions, routines, procedures, etc. for controlling the device 400. The parameters to be managed are defined in a dynamic MIB 412, which is a structure of objects with values indicating the status of the device 400. The agent 408 accesses the objects in the dynamic MIB 412 through a MIB manager 410. In a similar manner as described previously, the MIB manager 410 is a set of software interfaces, semantics, procedures and data structures that work together as a system to dynamically manage a tree of SNMP data objects defined within the dynamic MIB 412 and identified by OIDs.

The device 400 may include an internal management console 414, which sends requests, such as SNMP requests, to the management module 402, and thus to the agent 408, to determine and to modify OID identified object values as desired. More typically, an external management console 416 interfaces with the device 400 across a communication link 418. The communication link 418 is any type known to those skilled in the art, including wired links such as network segments, input/output (I/O) buses, modem or telephone lines, etc., and further including wireless links, such as infrared, radio, microwave, etc. The device 400 includes an internal link 420 to the management module 402 to enable communication with the external management console 416.

The device 400 includes one or more hardware options as desired, such as OPTION1 430, OPTION2 432, . . . , OPTIONn 434 for up to "n" options. Each option 430–434 is associated with a software module MOD1 440, MOD2 442, . . . , MODn 444, respectively, for updating or upgrading the agent 408 to include management functions for the associated option. Each of the upgrade modules 440–444 is added when the corresponding option 430–434 is added to or incorporated in the device 400. Each of the upgrade modules 440–444 includes a definition of one or more objects and/or branches to be added to the dynamic MIB 412 to enable management of the associated option 430–434, and further includes functions and routines for controlling the added portion of the dynamic MIB 412. Either the agent 408 or each of the modules 440–444 includes code for calling the modification routines, such as BranchAdd or BranchRemove, within the MIB manager 410 for upgrading the dynamic MIB 412. Once the objects or branches are added to the dynamic MIB 412, each of the respective modules 440–444 are able to monitor, modify and otherwise manage the associated options 430–434. As described previously, the agent 408 and each of the added modules 440–444 interface the dynamic MIB 412 through the MIB manager 410.

Figure 5A:
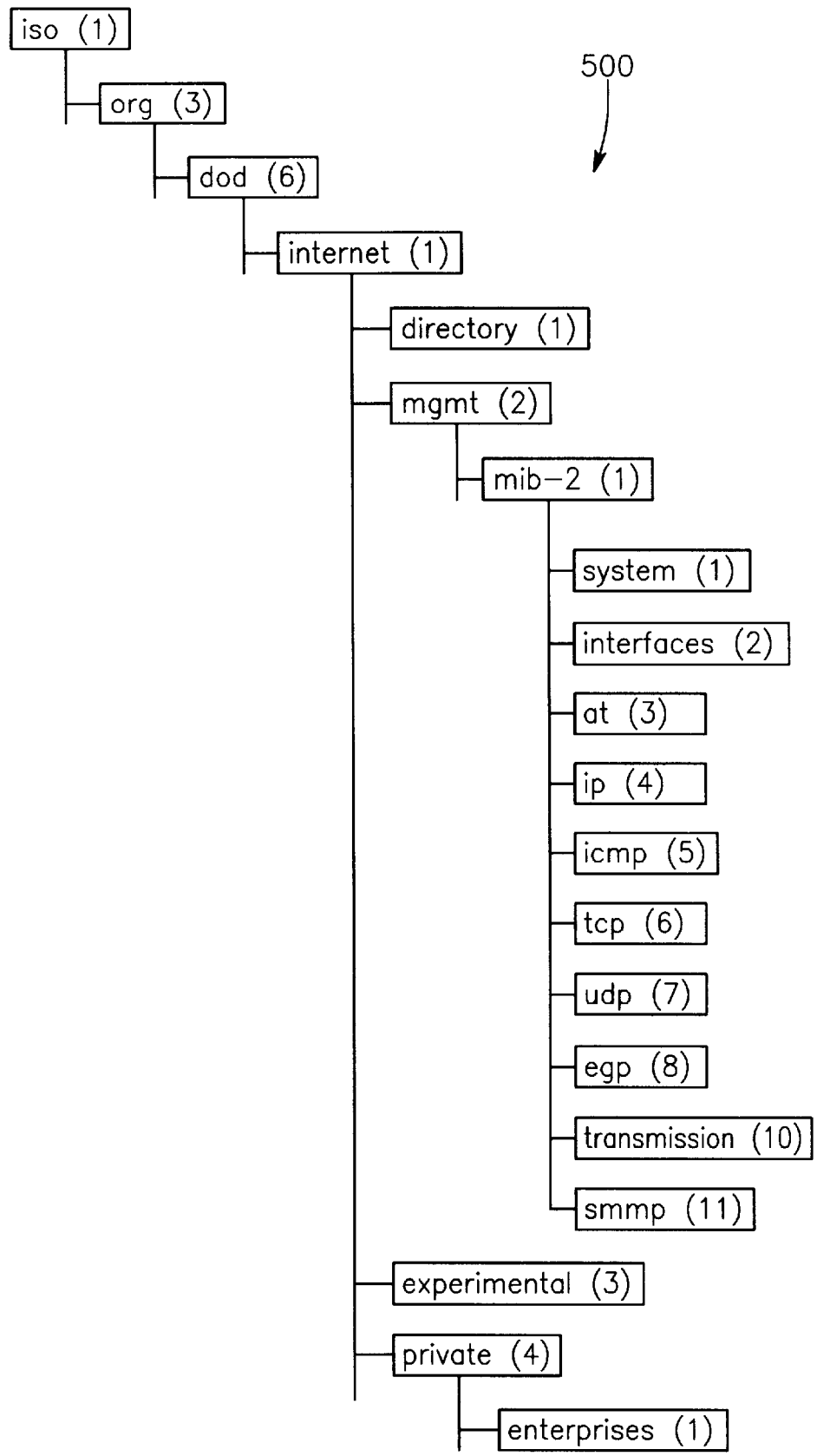
FIG. 5A is a diagram representing the standard MIB-II structure.

FIG. 5A is a diagram representing a standard MIB, referred to as MIB-II 500. Each of the nodes shown in the MIB-II 500 are branches, which may further include leaves for the objects themselves. The third branch of the MIB-II 500 under the iso root node is a branch for other organizations (org), where the sixth organization node is the United States (U.S.) Department of Defense (dod). The first subnode under the dod node is the internet node, which is allocated for administration by the Internet Activities Board (IAB). The internet node includes a management (mgmt) subnode, which is used for objects defined in IAB-approved documents including MIB definitions approved by the IAB. At least two versions of MIB are known, including mib-I and mib-II, where mib-II is an extension of mib-I. Only one of the mibs would be present in any given configuration.

Figure 5B:
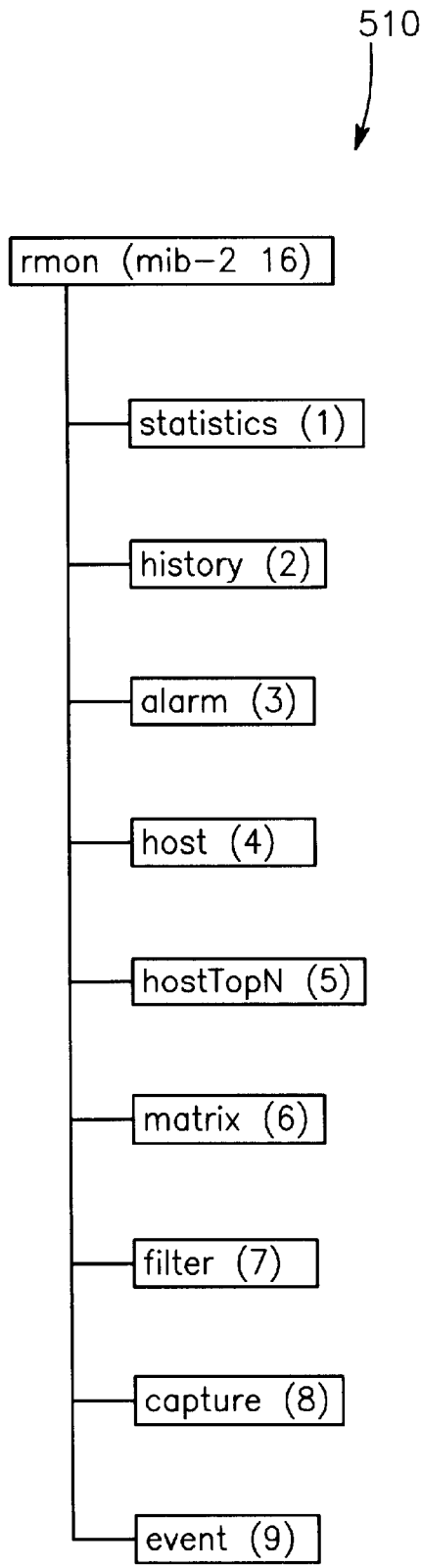
FIG. 5B is a diagram representing a standard RMON MIB.
Figure 5C:
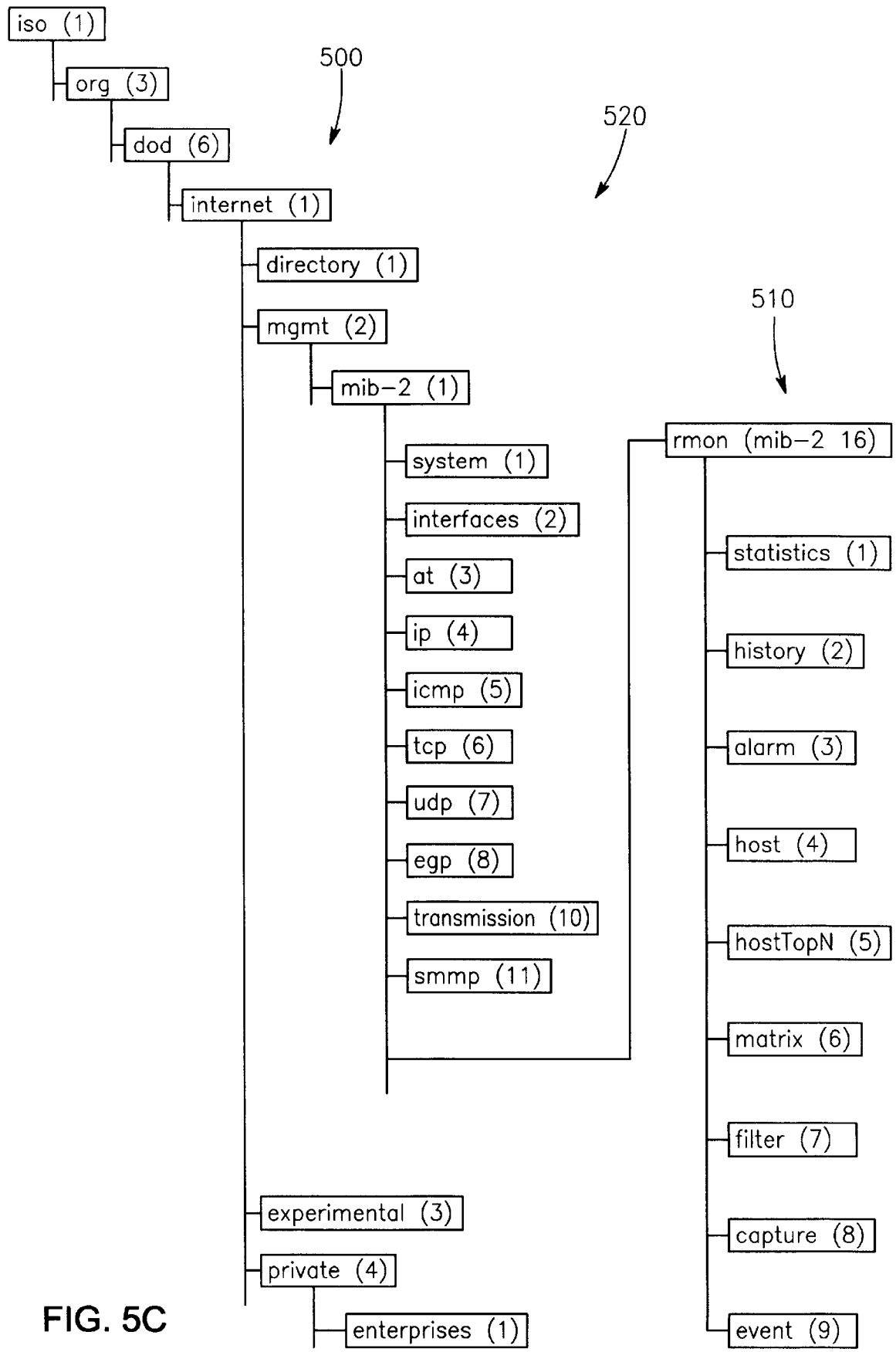
FIG. 5C is a diagram of a modified MIB including MIB-II combined with the RMON MIB.

Each node has an object identifier OID, which is a series of integers denoting each branch separated by periods. For example, the OID for mib-II objects of the MIB-II 500 is 1.3.6.1.2.1, identifying the iso, org, dod, internet, mgmt and mib-2 nodes, respectively. FIG. 5B is a diagram representing an RMON MIB 510, which is intended to be added as branch (16) of a mib-II branch of the MIB-II 500. FIG. 5C is a diagram of a modified MIB 520, which includes the MIB-II 500 and the RMON MIB 510 added thereto. Thus, the OID for the RMON subtree of the MIB 520 is 1.3.6.1.2.1.16, where RMON elements have the following OIDs: 1.3.6.1.2.1.16.1, 1.3.6.1.2.1.16.2, 1.3.6.1.2.1.16.3, etc. The MIB 520 may define the same upgraded MIB 206 shown in FIG. 2D after the RMON software module 230 is added.

It is now appreciated that a dynamic management information base (MIB) manager according to the present invention is a set of software interfaces, semantics, procedures and data structures that work together as a system to dynamically manage a tree of SNMP data objects identified by a standard object identifier (OID) along with each object's value. A MIB manager according to the present invention is fully dynamic, and enables an agent to use the interface of the MIB manager to dynamically add and delete MIB objects by OID. When a new object or OID is added to the MIB tree, the agent provides the MIB manager with references to subroutines within the agent and external to the MIB manager, which subroutines operate to manage the identified objects by monitoring and controlling the objects' values.

A MIB manager according to the present invention maintains a MIB structure of objects for control by an agent. The agent includes functions for managing initially defined objects in the MIB structure and a definition of one or more new objects. The MIB manager includes an agent interface for receiving commands from the agent and for providing object values to the agent from the MIB structure, a MIB interface for reading and modifying object values in the MIB structure and for modifying the MIB structure, and one or more functions for reading and modifying values of objects in, for adding objects to and for removing objects from the MIB structure as controlled by the agent. A MIB manager function adds a new object to the MIB structure in response to a request by the agent and according to the definition within the agent of the new object. Another MIB manager function removes one or more existing objects in the MIB structure as desired.

Security of each added module is dynamically defined as well. A newly added object, table row, table or branch may reference an existing security definition or a new security definition may be defined. A security definition establishes a set of access rights for management stations, where access rights include no access, read-only access or full or set (read-write) access. Access rights may be defined so that different management stations have different levels access. Thus, for example, four different management stations may see four different views of the same MIB based on the different access rights.

Appendix A, attached hereto, is computer source code written in the C programming language detailing one embodiment of the present invention. The code in Appendix A illustrates the interfaces, semantics, data structures and procedures of a particular MIB manager implemented according to the present invention. However, the present invention is not limited to the embodiment described by the code in Appendix A.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A management information base (MIB) manager for maintaining a MIB structure of objects for control by an agent, the agent including functions for managing initially defined objects in the MIB structure and a definition of at least one new object, the MIB manager comprising:
   an agent interface for receiving commands from the agent and for providing object values to the agent from the MIB structure;
   a MIB interface for reading and modifying object values in the MIB structure and for modifying the MIB structure; and
   a plurality of functions for reading and modifying values of objects in, for adding objects to and for removing objects from the MIB structure as controlled by the agent;
   wherein said plurality of functions add a new object to the MIB structure in response to a request by the agent and according to the definition within the agent of the new object.

2. The MIB manager of claim 1, wherein said plurality of functions includes an add function called with an address to a location within the agent to a definition of a new object for adding the new object to the MIB structure.

3. The MIB manager of claim 1, wherein said plurality of functions includes a remove function for removing an existing object from the MIB structure.

4. A management module for managing a device, comprising:
   a processor; and
   memory for storing data and executable code for execution by said processor, said data and executable code including:
      a management information base (MIB) structure defining objects associated with the device for managing the device; and
      a MIB manager for maintaining said MIB structure, said MIB manager including executable code for dynamically modifying the structure of said MIB structure during operation.

5. The management module of claim 4, wherein said memory further includes:
   an agent including executable code for managing operation of the device as defined by objects within said MIB structure, wherein said agent interfaces with said MIB manager for reading and modifying values of said objects; and
   wherein said MIB manager includes an agent interface for enabling said agent to manage operation of the device through said MIB manager.

6. The management module of claim 5, wherein said memory further includes:
   an upgrade module for upgrading said agent, said upgrade module including:
      a definition of at least one new object for adding to said MIB structure; and
      a procedure called in response to changes of the device for commanding said MIB manager to add said definition of at least one new object to said MIB structure;
   wherein said MIB manager adds said definition of at least one new object to said MIB structure in response to said procedure.

7. The management module of claim 6, wherein said upgrade module further includes:
   a remove procedure called in response to changes of the device for commanding said MIB manager to remove an identified object from said MIB structure.

8. The management module of claim 6, wherein said upgrade module further comprises:
   executable code for managing said at least one new object.

9. The management module of claim 6, wherein said upgrade module further comprises:
   a reference to a security definition defining security rights for said at least one new object.

10. The management module of claim 4, wherein said memory further includes:
    an agent including executable code for managing operation of the device as defined by objects within said MIB structure, wherein said agent interfaces with said MIB manager for reading and modifying values of said objects, said agent further including an add procedure for commanding said MIB manager to add a new object to said MIB structure with an address to a definition of said new object; and
    an upgrade module for upgrading said agent in response to changes of the device, said upgrade module including said definition of said new object;
    wherein said MIB manager includes an agent interface for enabling said agent to manage operation of the device through said MIB manager, and wherein said MIB manager adds said definition of at least one new object to said MIB structure in response to said add procedure.

11. The management module of claim 10, wherein said agent further includes:
    a remove procedure for commanding said MIB manager to remove an identified object from said MIB structure.

12. A network system, comprising:
    a plurality of network nodes;
    a network device, including:
       a plurality of ports, each for coupling to one of said plurality of network nodes;
       a processor; and
       memory for storing data and executable code for execution by said processor, said data and executable code including:

a management information base (MIB) structure defining objects associated with said network device for managing said network device; and a MIB manager for maintaining said MIB structure, said MIB manager including executable code for dynamically modifying the structure of said MIB structure during operation.

13. The network system of claim 12, wherein said memory further includes:

an agent including executable code for managing operation of said network device as defined by objects within said MIB structure, wherein said agent interfaces with said MIB manager for reading and modifying values of said objects; and wherein said MIB manager includes an agent interface for enabling said agent to manage operation of said network device through said MIB manager.

14. The network system of claim 13, wherein said memory further includes:

an upgrade module for upgrading said agent, said upgrade module including:
 a definition of at least one new object for adding to said MIB structure; and
 a procedure called in response to changes of said network device for commanding said MIB manager to add said definition of at least one new object to said MIB structure;

wherein said MIB manager includes an add function for adding said definition of at least one new object to said MIB structure in response to said procedure.

15. The network system of claim 14, wherein said upgrade module further includes:

a remove procedure called in response to changes of said network device for commanding said MIB manager to remove an identified object from said MIB structure; and said MIB manager including a remove function for removing said identified object from said MIB structure.

16. The network system of claim 14, wherein said upgrade module further comprises:

executable code for managing said at least one new object.

17. The network system of claim 14, wherein said upgrade module further comprises:

a reference to a security definition defining security rights for said at least one new object.

18. The network system of claim 12, wherein said memory further includes:

an agent including executable code for managing operation of said network device as defined by objects within said MIB structure, wherein said agent interfaces with said MIB manager for reading and modifying values of said objects, said agent further including an add procedure for commanding said MIB manager to add a new object to said MIB structure with an address to a definition of said new object; and an upgrade module for upgrading said agent in response to changes of said network device, said upgrade module including said definition of said new object;

wherein said MIB manager includes an agent interface for enabling said agent to manage operation of said network device through said MIB manager, and wherein said MIB manager includes an add function for adding said definition of at least one new object to said MIB structure in response to said add procedure.

19. The network system of claim 18, wherein said agent further includes:

a remove procedure for commanding said MIB manager to remove an identified object from said MIB structure; and said MIB manager including a remove function for removing said identified object from said MIB structure.

20. The network system of claim 12, further comprising:

a slot for receiving and coupling an uplink device for expanding the network system; and wherein said memory further includes:
 an agent including executable code for managing operation of said network device as defined by objects within said MIB structure, wherein said agent interfaces with said MIB manager for reading and modifying values of said objects; and
 a software module for upgrading said agent in response to said uplink device being plugged into said slot, said software module including:
  a definition of at least one uplink object for adding to said MIB structure for defining objects associated with management of said uplink device; and
  an add procedure for commanding said MIB manager to add said definition of at least one uplink object to said MIB structure;

said MIB manager including an agent interface for enabling said agent to manage operation of said network device with said through said MIB manager, and wherein said MIB manager includes an add function for adding said definition of at least one uplink object to said MIB structure in response to said add procedure.

21. The network system of claim 20, wherein said software module further comprises:

executable code for managing said at least one uplink object for enabling management of said uplink device.

22. The network system of claim 21, further comprising:

one of said plurality of network nodes including a management console for submitting requests to said agent of said network device.

* * * * *